May 26, 1959  A. E. ZAHLTEN  2,888,056
ANTI-SKID TIRE

Filed Aug. 14, 1956  2 Sheets-Sheet 1

INVENTOR.
AUGUST EDWARD ZAHLTEN
BY
Carl Miller
ATTORNEY

May 26, 1959  A. E. ZAHLTEN  2,888,056
ANTI-SKID TIRE

Filed Aug. 14, 1956  2 Sheets-Sheet 2

INVENTOR.
AUGUST EDWARD ZAHLTEN
BY
Carl Miller
ATTORNEY

United States Patent Office 2,888,056
Patented May 26, 1959

2,888,056
ANTI-SKID TIRE
August Edward Zahlten, Jersey City, N.J.
Application August 14, 1956, Serial No. 603,957
1 Claim. (Cl. 152—208)

This invention relates to vehicle tires and, more particularly, to anti-skid pneumatic automobile type tires.

In view of the dangers associated with driving vehicles over slippery and icy roads, various types of devices have been proposed for preventing the vehicle from skidding, such as automobile chains and the like. While these devices are satisfactory for certain purposes, their use requires the operator of the vehicle to install the devices on the tires and otherwise cause various inconveniences which detract from their desirability. An object of this invention therefore, is to provide automatically operated means that are built into the vehicle wheel and tire assembly, which can be used to prevent skidding and slipping of the vehicle and which will overcome the aforementioned difficulties.

Another object of this invention is to provide fluid pressure operating means for automatically operating anti-skid apparatus associated with the wheel and tire assembly of automotive vehicles.

A still further object of this invention is to provide an anti-skid tire construction that may be selectively pressurized to move the anti-skid elements into an operative position relative to the tire when needed, and which is automatically retractable when not in use.

All of the foregoing and still further objects and advantages of this invention will become apparent from a study of the following specification, taken in connection with the accompanying drawing, wherein.

Figure 1:
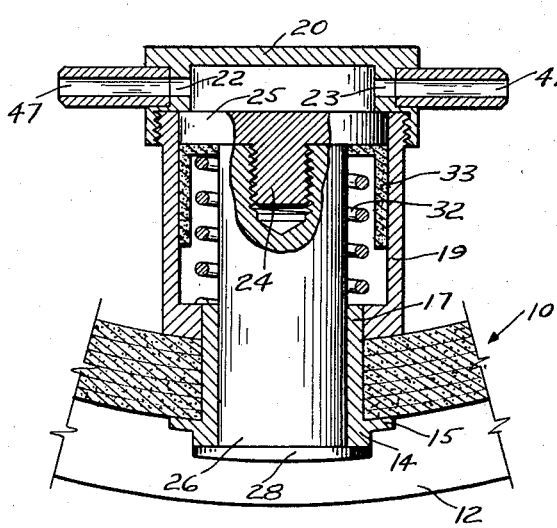
Figure 1 is a cross sectional view showing a device made in accordance with this invention in a retracted or inoperative position.
Figure 2:
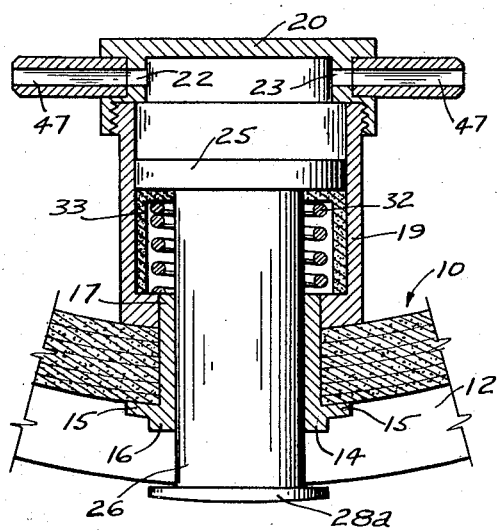
Figure 2 is a view similar to Figure 1 showing the device in a projected or operative position.

Referring now to Figures 1 and 2 of the drawing, a single unit of the present invention is shown in operative association with a tubeless type of tire 10 having various spaced tread elements 12. As more clearly shown in Figure 2, a bearing sleeve 14 and 16 extends through the tire wall between spaced treads 12 and has a circular flange 15 at its outer end in engagement with exterior surfaces of the tire, and at its inner extremity 17 is adapted to rigidly support a pressure cylinder 19 that is in sealing engagement with the interior surface of the tire. The upper or inner extremity of each cylinder 19 is closed by means of a cylinder head 20 that has an inlet and outlet port 22, 23, respectively, associated therewith for receiving and discharging a compressed fluid that is adapted to affect the operation of a piston assembly contained within the cylinder. As more clearly shown in Figure 1, a circular piston head 25 having a depending threaded stud 24 is secured to a longitudinally extending piston rod 26 that extends outwardly through the bearing sleeve 14 and terminates in an enlarged circular friction surface foot 28.

Figure 3:
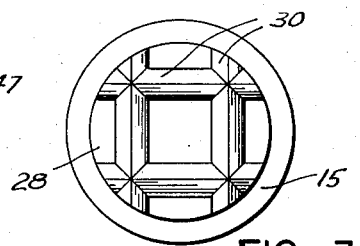
Figure 3 is a bottom plan view of one form of anti-skid surface adapted for use in connection with the present invention.
Figure 4:
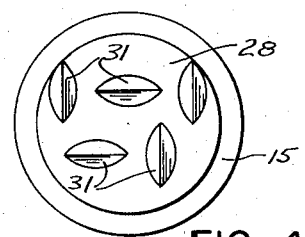
Figure 4 is a view similar to Figure 3 showing a modified form of anti-skid surface.
Figure 5:
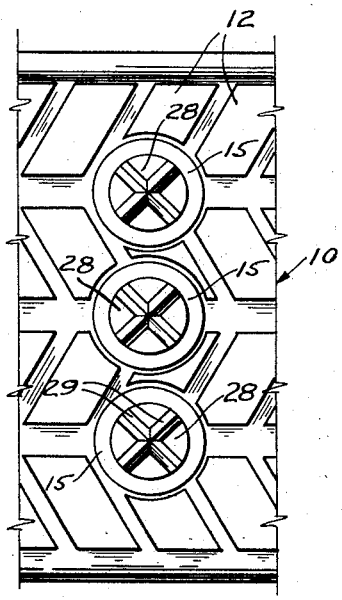
Figure 5 is a bottom plan view of the device shown in Figure 6, showing a still further modified form of anti-skid surface.

As shown in Figure 5, the foot 28 of the device may be embossed with a pair of intersecting bars 29, or a plurality of perpendicularly related bars 30 forming a centrally disposed rectangle, as shown in Figure 3. Another form of friction surface is shown in Figure 4, wherein a plurality of spaced and perpendicularly related protuberances 31 define a very effective type of friction surface. It is to be understood that either of these described friction surfaces may be used in connection with the device, depending upon the particular type of terrain or use to which the device is to be put.

A resilient, cylindrical gasket 33 is disposed within the cylinder 19 immediately adjacent to the piston head 25 so as to provide an effective seal which prevents the escape of air from the interior of the tire out through the anti-skid device, particularly during the reciprocating movement of the piston plunger relative thereto. The gasket is properly held in position adjacent to the piston head by means of the compression spring 32 that is effective to return the piston head and plunger to a retracted or inoperative position, as shown in Figure 1, during the period that the device is not being used.

Figure 7:
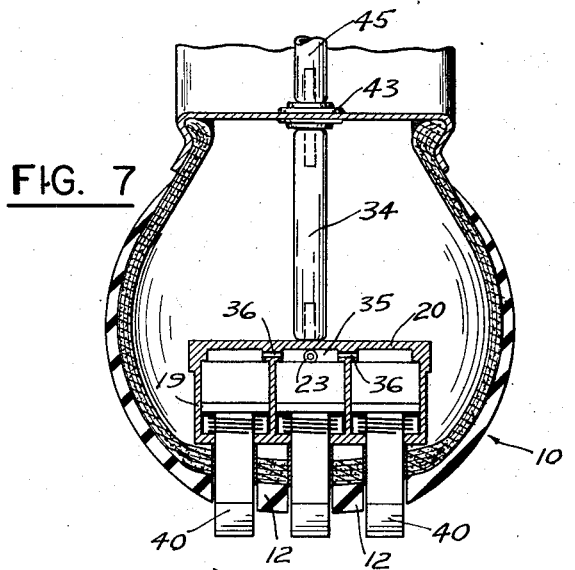
Figure 7 is a cross sectional view of the device shown in Figure 6.
Figure 6:
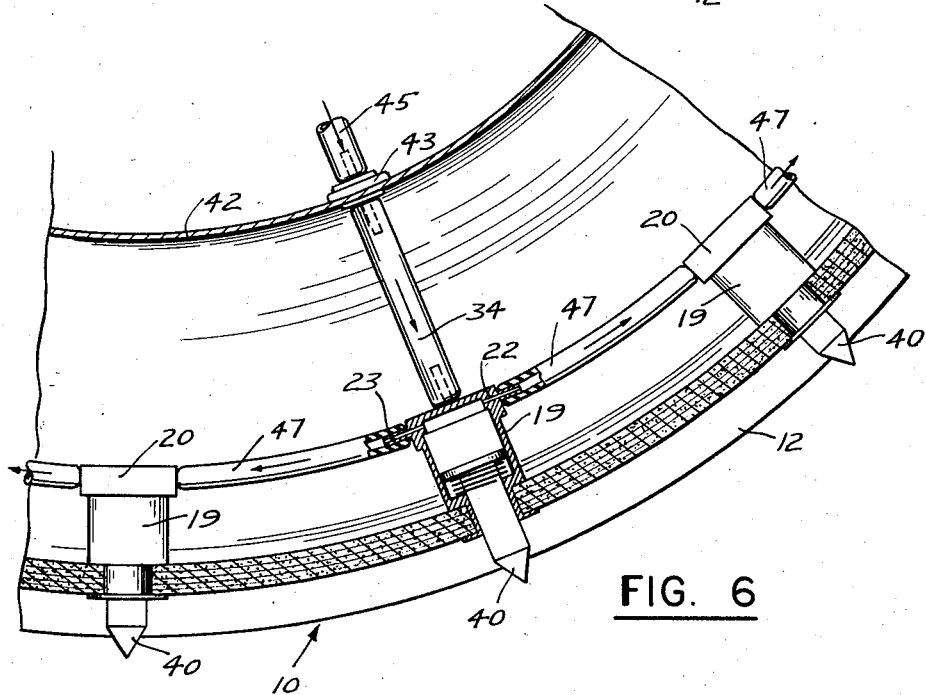
Figure 6 is a longitudinal sectional view of the assembled tire and anti-skid device.

As more clearly shown in Figures 6 and 7, each anti-skid assembly includes three laterally spaced and substantially identical piston and cylinder assemblies hereinbefore described. Each such set of three assemblies is arranged transversely of the tire and is equally spaced, circumferentially, from the next adjacent set around the circumference of the tire and wheel. Each such set is connected to the next adjacent set by means of air supply connecting lines 47 which communicate directly with the interior of the centrally disposed cylinder and piston assembly through the respective inlet and outlet ports 22, 23. Connecting ports 36 connect each of the interiors of the three adjacent cylinders with each other so as to provide an equalized actuating force on the pistons disposed therein. Air is supplied to each of the sets and to each of the cylinders in such sets by means of an air supply line 34 that extends from the central unity of one such set outwardly towards the inside surface of the wheel 42 to an assembled air inlet valve 43. This system is adapted to be supplied with a pressurized fluid through a connecting air supply valve 45 which may be associated with an exterior source of pressurized fluid, or with a source of pressure fluid that may be carried by the vehicle. In the arrangement as shown in Figures 6 and 7, the friction heads of each piston and piston rod assembly is in the form of a wedge shaped spike 40 that is very effective on icy types of road surfaces.

In operation, each of the compression springs 32 is adapted to maintain the piston rod 26 in a retracted position as shown in Figure 1 of the drawing. When it is desired to use the anti-skid features of the present wheel and tire assembly, a pressurized fluid such as compressed air is introduced to the system through the inlet valve 43 that supplies the fluid to each of the respective sets of piston and cylinder assemblies, the air being distributed to each of the cylinders in such sets through the connecting ports 36. Since the cylinders of all of the units are in common communication with each other, there is a substantially complete equalization of pressure throughout the system, so that each piston is properly extended outwardly through its associated bearing sleeve 14, and into engagement with the particular road surface. The pressure is maintained in the system so long as it is desired to use the anti-skid features, after which, the air may be removed therefrom, whereupon the compression springs 32 are adapted to retract each of the friction surface heads 28 from an extended position 28a, as shown in Figure 2, to their retracted position 28, as shown in Figure 1.

While this invention has been described with particular reference to the specific forms shown in the drawing, it is to be understood that such is not to be construed as imparting limitations upon the invention, which is best defined by the claim appended hereto.

Having thus described my invention, I claim as new and desire to secure by Letters Patent:

An anti-skid tire including the combination of a hollow tire casing having an outer encircling tread portion and an inner compartment for receiving a pneumatic pressure fluid and a series of spaced apart cylinder openings, a plurality of circumferentially spaced groups of radially directed pressure cylinders occupying the cylinder openings in the casing, each of the cylinders being located completely within the inner compartment and having a reciprocable plunger extending radially through said casing with a bearing sleeve for each cylinder extending through said tread portion and each sleeve slidably receiving one of the plungers and being secured at one end thereof to its respectively associated cylinder while the other end of the sleeve has in each case an annular flange in a clamping bearing relation with the exterior of said tread for securing each cylinder and its sleeve to said tread portion, each plunger extending radially outward through its associated sleeve and said casing in direct response to introduction of pressure fluid into an associated cylinder, compression spring means disposed within said cylinders serving to retract the plungers within said casing upon withdrawal of pressure fluid from their associated cylinders, pressure fluid lines interconnecting the cylinders and a common source of pressure fluid, a pressure line connecting each one of said equally spaced groups of cylinders with the next adjacent group of cylinders and having fluid pressure ports interconnecting the respectively adjacent cylinders in each respective group, and a fluid pressure supply line connecting one of said cylinders with said source of pressurized fluid and having a fluid pressure valve in said supply line carried by a supporting wheel of the vehicle involved, each of the pressure cylinders also including resilient gasket means interposed between the cylinder walls and the respective plunger thereof and effecting a seal with the cylinder involved against loss of internal fluid pressure.

References Cited in the file of this patent

UNITED STATES PATENTS

| | | |
|---|---|---|
| 985,112 | Conrad | Feb. 21, 1911 |
| 1,231,957 | Smith | July 3, 1917 |
| 2,672,908 | Donegan | Mar. 23, 1954 |

FOREIGN PATENTS

| | | |
|---|---|---|
| 42,111 | Sweden | Feb. 28, 1917 |